United States Patent [19]

Altenburger

[11] 3,770,896

[45] Nov. 6, 1973

[54] LINE CIRCUIT WITH LOCKOUT

[75] Inventor: Otto Altenburger, Rochester, N.Y.

[73] Assignee: Stromberg-Carlson Corporation, Rochester, N.Y.

[22] Filed: June 15, 1971

[21] Appl. No.: 153,235

[52] U.S. Cl. .................................................. 179/18 F
[51] Int. Cl. ................................................ H04q 3/18
[58] Field of Search ................ 179/18 F; 340/253 R

[56] References Cited

UNITED STATES PATENTS 3,156,777 11/1964 Horwitz et al. .................... 179/18 F
3,067,411 12/1962 Dhimos .............................. 340/251

*Primary Examiner*—William C. Cooper
*Attorney*—Charles C. Krawczyk

[57] ABSTRACT

A line circuit for connecting an individual telephone line to a telephone switching network includes a dual coil line relay and a cutoff relay arranged in a balanced line configuration. Under normal off hook conditions, both the line and cutoff relays are operated. In a lockout condition the cutoff relay reminas operated through the off hook telephone. A monitor arrangement is provided for identifying the groups of line circuits that include a line circuit in lockout, for identifying the individual line circuits in lockout, and for providing an alarm signal when a preset number of line circuits are in lockout.

17 Claims, 3 Drawing Figures

OTTO ALTENBURGER
INVENTOR.

BY Charles C. Krawczyk
ATTORNEY

OTTO ALTENBURGER
INVENTOR.

BY Charles C. Krawczyk

ATTORNEY

OTTO ALTENBURGER
INVENTOR.

BY Charles C. Krawczyk
ATTORNEY

LINE CIRCUIT WITH LOCKOUT

BACKGROUND OF THE INVENTION

The invention pertains to telephone line circuits in general, and in particular to telephone line circuits including a lockout type arrangement.

When a subscriber lifts a telephone receiver from its cradle, he completes a closed loop path which implements the various and complex steps for tracing a circuit path through the switching network, so that a dial tone is received for dialing purposes. During this period and until after the dialing is completed, a great deal of common switching equipment is needed to process this call as well as other service requests which may be present. As long as a telephone receiver remains off hook without dialing (whether inadvertently or intentionally), the common switching equipment associated therewith remains tied up and the effective capacity for meeting traffic requirements is thereby reduced. This, of course, is highly undesirable since it is uneconomical and degrades the traffic handling capability of telephone equipment.

The foregoing problem can also arise as the result of an overhead telephone line falling to the ground and completing a closed path the same as if a telephone receiver went off hook. In this case, the common switching equipment would be tied up until the short circuit is located and corrected, which would prove especially troublesome in rural service areas.

At present there are line circuits available which will disconnect a telephone line (lockout) from the associated switching equipment and/or provide an indication thereof if dialing is not begun within a short period of time after the telephone loop is completed. Examples of such line lockout circuit arrangements are disclosed in the U.S. Pat. Nos. 2,959,642 and 3,529,098, entitled "Telephone System" and "Two Relay Line Circuit", respectively.

Since an individual line circuit is ordinarily required for each telephone line, the line circuit is the most prevalent component found in a telephone switching system and for economical reasons it is, therefore, highly desirable to minimize the number of elements which comprise it. For the same economical reasons, it is desirable to use as many standard elements as is feasible in the design of a line circuit. Line circuits with the lockout feature, such as disclosed in the above-identified patents, use only two relays (the usual line relay and cutoff relay). However, the relays are non-standard, requiring a special design to provide either slow release or a three coil operation. Furthermore, some of these line circuits are designed to operate only in an unbalanced line configuration wherein noise pickup can, at times, cause false operations of the line relay.

With the foregoing in mind, it is an object of the invention to provide a new and improved line circuit with lockout which utilizes only standard components and a minimum number of relays.

It is also an object of the invention to provide a new and improved line circuit with lockout which can be used in a balanced line configuration.

It is a further object of the invention to provide a new and improved monitoring circuit for use with a plurality of line circuits with lockout for identifying which line circuits are in a lockout condition.

It is still a further object of the invention to provide a new and improved monitoring circuit for use with a plurality of line circuits with lockout arranged in a plurality of groups to provide an indication of a line lockout condition in at least one of the line circuits in a group.

It is yet a further object of the invention to provide a new and improved alarm circuit for use with a plurality of monitor circuits for indicating that a preset number of line circuits are in lockout irrespective of how the line circuits in lockout are distributed throughout the group and/or groups.

BRIEF DESCRIPTION OF THE INVENTION

A line circuit for connecting an individual telephone line to a telephone switching network employs a line relay in a balanced line configuration connected so that the line relay is energized via a closed loop path through the telephone line when the subscriber goes off hook. A cutoff relay, in response to a signal via a sleeve terminal of the switching network, operates to complete a connection for the call through the network and to disconnect the line relay from the telephone line and connect it to the sleeve terminal so that both relays remain energized by the sleeve signal. Should dialing not be initiated and completed within a prescribed period, the sleeve signal is removed causing the line relay to drop out before the cutoff relay wherein the cutoff relay is then connected to the telephone line and remains energized by a path through the off hook telephone. Under this condition, the telephone line is locked out from the switching network so that no further requests for service are acknowledged. The cutoff relay remains energized until the abnormal line condition is corrected, at which point, the cutoff relay drops out and the lockout condition is removed.

A further feature of the invention includes a monitor circuit for providing an indication that line circuits are in lockout. When a plurality of line circuits are arranged in groups, a plurality of monitor circuits are used to indicate a lockout condition in any of the line circuits within the groups and for identifying the individual line circuits in the lockout condition. An alarm circuit is also included to provide an indication when a preset number of line circuits are in lockout.

DESCRIPTION OF THE PREFERRED EMBODIMENT

Figure 1:
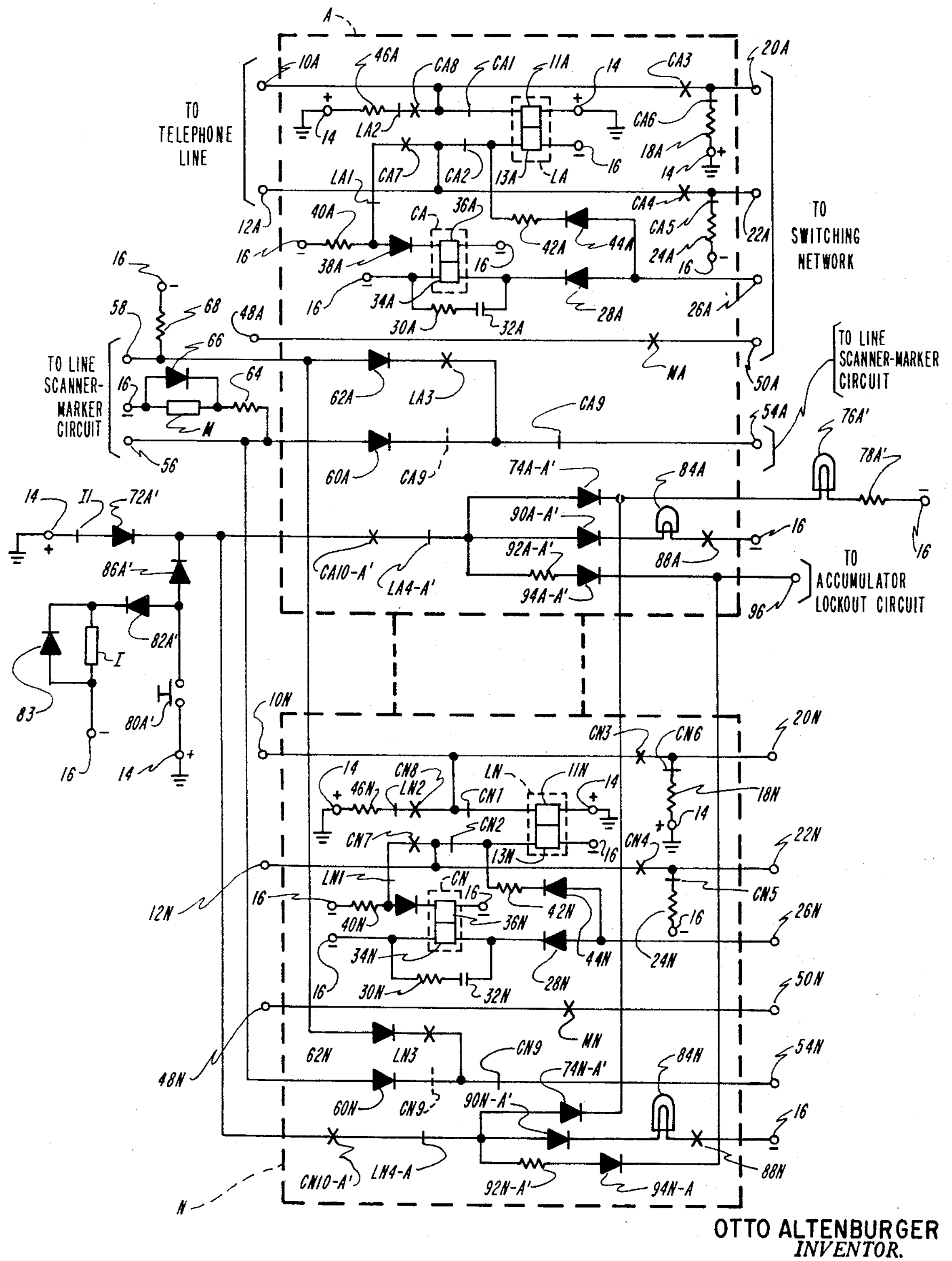
FIG. 1 shows a plurality of the line circuits (A-N) with lockout.

FIG. 1 shows an arrangement for a plurality of the line circuits with lockout (A-N) depicting in detail only the line circuits A and N. Since each line circuit is identical, its structure and operation will be described in terms of line circuit A. The line circuit of the invention is designed to be used in a telephone system in conjunction with a scanner and marker arrangement disclosed in a copending patent application, Ser. No. 101,091, entitled "Line Scanner And Marker", filed on Dec. 23, 1970, for Otto Altenburger and Cunter F. Neumeier and assigned to the assignee of the present patent application.

Each line circuit includes a pair of tip and ring terminals for connection to an individual telephone line, and four terminals, tip, ring, sleeve and mark, for connection to a telephone switching network. In addition, each line circuit has a separate terminal for connection to a line scanner-marker circuit (not shown) and is also connected to a pair of common terminals for connection to the line scanner-marker circuit.

A first pair of tip and ring terminals 10A and 12A, respectively, of the line circuit A are adapted for connection to an individual telephone line. A line relay LA is connected to the terminals 10A and 12A through the normally closed contacts CA1 and CA2 of a cutoff relay CA. The line relay LA is a dual coil relay with one coil 11A connected between the terminal 10A and a terminal 14 which is adapted for connection to one of the terminals of a direct current (DC) power source, such as the positive or ground terminal. The other coil 13A of the relay LA is connected between the terminal 12A and a terminal 16 which is adapted for connection to the other terminal of the DC power source, such as the negative terminal. The power terminals 14 and 16, which are provided for connecting different parts of the line circuits to a common DC source, are shown separated in FIG. 1 at the various connection points only for simplifying the drawing.

A second pair of tip and ring terminals 20A and 22A, respectively, are for connecting the line circuit A to the telephone switching network. The terminal 20A is connected to the terminal 10A through the normally open contacts CA3 of the relay CA, and the terminal 22A is connected to the terminal 12A through the normally open contacts CA4 of the relay CA. A resistor 24A in series with the normally closed contacts CA5 of the relay CA connects terminal 22A to the power terminal 16. The normally closed contacts CA6 connects the terminal 20A to the power terminal 14 through a resistor 18A.

The cutoff relay CA is a dual coil relay with one coil 34A connected between the power terminal 16 and a sleeve terminal 26A through a diode 28A. The sleeve terminal 26A is adapted for connection to the telephone switching network. A resistor 30A and capacitor 32A are connected in series across the terminals of coil 34A for retarding its response time. The second coil 36A of relay CA is connected between the power terminal 16 and the terminal 12A through a diode 38A, the normally closed contacts LA1 of the relay LA and the normally open contacts CA7 of the relay CA. A resistor 40A is connected between the power terminal 16 and the junction of the diode 38A and the contacts LA1 for minimizing the current possibly flowing through coil 36A of the cutoff relay CA via a leakage current path across the telephone line during an on hook condition so that the cutoff relay will not operate.

A current limiting resistor 42A is connected in series with a diode 44A between the sleeve terminal 26A and the junction of coil 13A of the line relay LA and the contacts CA2. A current limiting resistor 46A interconnects the power terminal 14 and terminal 10A through the normally closed contacts LA2 of the line relay LA and the normally open contacts CA8 of the cutoff relay CA.

The line circuit A has a mark terminal 48A for connection to the line scanner-marker circuit and another mark terminal 50A for connection to the telephone switching network. The terminals 48A and 50A are connected through the normally open contacts MA of a mark relay M which has separate normally open contacts in all the mark lines of all line circuits and is common to all line circuits.

A terminal 54A of line circuit A is provided for connection to the line scanner-marker circuit. A pair of terminals 56 and 58, common to all the line circuits, is also provided for connection to the line scanner-marker circuit. The normally closed contacts CA9 of the cutoff relay CA in series with a diode 60A interconnects the terminal 54A and 56. The normally open contacts LA3 of the line relay LA in series with a diode 62A connects the terminal 58 to the junction of the contacts CA9 and the diode 60A. The normally closed contacts CA9 may alternatively be placed between the junction of the leads from the common terminals 56 and 58 and diode 60 as illustrated in dashed lines. The diodes 60A and 62A are designed to prevent signals from the line scanner-marker circuit feeding back between the terminals 56 and 58. The mark relay coil M is connected between the terminal 56 and the power terminal 16 through a current limiting resistor 64. A diode 66 is connected across relay coil M to provide a shunt path for eliminating any voltage spikes which may build up across the coil when the relay is released. A resistor 68 is connected between the terminal 58 and the power terminal 16 for normally reverse biasing the diodes 62A–62N.

When the telephone receiver connected to the line circuit A goes off hook so as to originate a call, a direct current path is connected across the terminals 10A and 12A, completing the circuit for actuating the line relay LA, which, in turn, closes the contacts LA3 and opens the contacts LA1 and LA2. A scanning ground signal from the line scanner-marker circuit applied at the terminal 58 is then transmitted to the terminal 54A via the closed contacts LA3 and CA9 to indicate a request for service. In response to the service request, the line scanner-marker circuit applies a ground signal at the terminal 56 which actuates the mark relay M, thereby closing the contacts MA-MN interconnecting all the mark terminals in all the line circuits. A resistance battery is applied by the line scanner-marker circuit to the mark terminal 50A via the mark terminal 48A and the closed contacts MA to provide a mark signal to the switching network for path finding purposes. A system for locating free paths through a telephone network is disclosed in a copending patent application, Ser. No. 153,221, entitled "Path Finding System", filed on June 15, 1973 for Otto Altenburger and Robert Bansemir now U.S. Pat. No. 3,729,593, assigned to the assignee of the present patent application.

When a free path to a register has been detected, a ground signal is applied in the register to the other end of the free path so that current flows in the mark circuit from the resistance battery to pick up the crosspoint devices in the network and complete the free path. The DC potential applied to the tip and ring terminals 20A and 22A through the contacts CA6 and CA5, respectively, permits the register to make a continuity check through the tip and ring contacts of the selected free path. If the tip and ring continuity check indicates a complete connection, a ground signal is applied to the sleeve terminal 26A from the register via the switching network which holds all operated crosspoint devices in the network and also operates the cutoff relay CA. The relay CA opens the contacts CA1 and CA2 thereby disconnecting the line relay LA from the telephone line. The relay LA remains energized, however, via a closed path from the power terminal 16 connected to the coil 13A through the resistor 42A and the diode 44A to the ground signal applied at the sleeve terminal 26A. The contacts CA9 are opened simultaneously therewith so that the calling party cannot be called by another subscriber when his receiver is off hook. The relay CA also opens the contacts CA5 and CA6 removing the DC potential used for making a tip-ring continuity check and closes the contacts CA3 and CA4, completing the tip and ring connections from the calling telephone to the switching network. A dial tone is then transmitted to the telephone receiver requesting service so that dialing may begin and the relay M releases since the marking process has been completed. Although the contacts CA7 and CA8 close at this time the cutoff relay CA is not connected to the telephone line since the line relay LA remains energized and, consequently, the contacts LA1 and LA2 are open. This condition, wherein the line relay LA and the cutoff relay CA are both energized and disconnected from the telephone line lasts so long as the ground signal is applied to the sleeve terminal 26A which is the case through-out the course of a normal telephone call.

Should dialing not be initiated within a preset time after the ground signal is applied to terminal 26A, a connection is made to a permanent signal trunk. The permanent signal trunk applies an audible signal to the circuit and after a preset period of time removes the ground signal from the terminal 26A disconnecting the line circuit from the telephone switching equipment and removing the energizing potential from the line relay LA and the cutoff relay CA. Because of the capacitor 32A and the resistor 30A in the circuit shunting the coil 34A, the cutoff relay CA is slower to release than the line relay LA. Thus, before relay CA is deactuated, the contacts LA1 and LA2 close, thereby re-energizing the coil 36A of the relay CA via a path from the terminal 16 through the coil 36A, the telephone, and/or telephone line and set and resistor 46A to the power terminal 14 (the contacts CA7 and CA8 are still closed at this time since the response of coil 34A is retarded). The telephone line and set are now in a lockout condition wherein the line relay LA is de-energized and the cutoff relay CA is energized via a closed path through the connected telephone line and off hook telephone set. The contacts CA9 of the relay CA remain open at this time to prevent a request for service or another subscriber from calling the party when the telephone line is in lockout. When the cause of the lockout condition is removed (returning the receiver to its cradle, for example) the closed path through the telephone line is broken, and relay CA releases, thereby restoring theline circuit to its normal state prior to a telephone service request. The following table provides a summary of the operation of the line circuit with lockout:

| Telephone Line Condition | Line Relay LA | Cutoff Relay CA |
|---|---|---|
| Normal - On hook | De-energized | De-energized |
| Normal - Off hook | Energized | Energized |
| Abnormal - Lockout | De-energized | Energized |

To describe a terminating call operation in the line circuit with lockout, it will be assumed that the called telephone is connected to the line circuit A in FIG. 1. The line scanner-marker circuit has already identified this particular line circuit. The line scanner then makes an idle/busy check for this circuit by applying a ground signal at the terminal 56 which is transmitted to all of the 54A–54N terminals connected to idle line circuits via the CA9–CN9 contacts which are closed. Any line circuit which is already busy (indicating that the connected telephone is in use) will have its contacts open (CA9–CN9) preventing the ground signal from passing through to the 54A–54N terminals. The absence of a ground signal at a 54A–54N terminal is detected by the line scanner-marker circuit which indicates a busy condition and the terminating call for the line circuit is not completed.

Assuming that the line circuit A is idle, contacts CA9 are closed and the ground signal from terminal 56 is transmitted to terminal 54A and detected by the line scanner-marker circuit (which knows the appropriate line circuit terminal 54A–54N to monitor). The line scanner-marker then proceeds to terminate the call.

The above ground signal on terminal 56 also actuates the mark relay M which closes the contacts MA–MN interconnecting all the mark circuits (terminals 48A–48N and 50A–50N) in all the line circuits. A resistance battery is applied by the line scanner-marker circuit to the mark terminal 50A via the mark terminal 48A and the closed contact MA to provide a mark signal to the switching network for path finding purposes for connection to the junctor circuit seized by the calling party. When a free path to a junctor has been detected, a ground signal is applied to the mark lead in the junctor at the other end of the free path so that current flows from the resistance battery to pick up the crosspoint devices in the network and complete the free path. The DC potential applied to the tip and ring terminals 20A and 22A through the contacts CA6 and CA5, respectively, permits the junctor control to make a continuity check through the tip and ring contacts of the selected free path. If the tip and ring continuity check indicates that a connection is complete, a ground signal is applied to the sleeve terminal 26A from the junctor via the switching network which holds all operated crosspoint devices in the network and also operates the cutoff relay CA. Relay CA actuates its contacts in the same manner as previously described under an originating call, marking the selected line busy, completing the line circuit tip and ring connections and permitting the called subscriber to be rung. The mark relay M is then released since the marking process has been completed.

Figure 2:
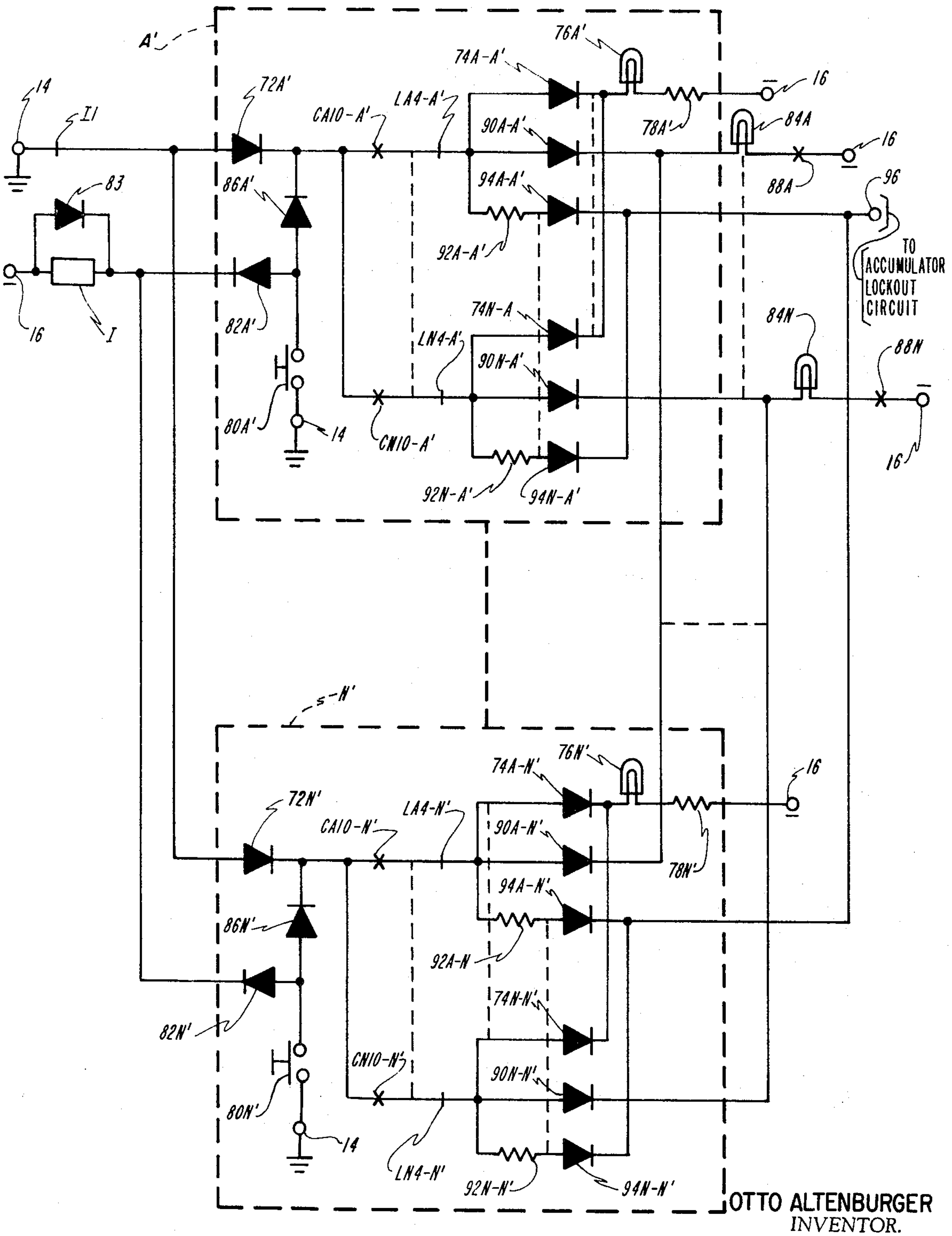
FIG. 2 shows a plurality of monitor circuits (A'-N') adapted for connection to a plurality of line circuit groups, each group containing a plurality of line circuits as shown in FIG. 1.

A further feature of the invention is the circuit used to monitor lockout wherein a plurality of the line circuits are arranged in a single group and a plurality of these monitor circuits (A'–N') corresponding to a plurality of groups of line circuits are connected together as shown in FIG. 2. A single monitor circuit A' is also illustrated together with its associated group of line circuits in FIG. 1 (same reference numbers used in FIGS. 1 and 2). The monitor circuit provides an indication that a lockout condition exists in a group and is further used to identify the particular line circuit in the group exhibiting lockout.

Each monitor circuit has a plurality of separate electrical paths equal to the number of line circuits in the group to be monitored, wherein each path corresponds to a different line circuit. Each path contains normally open contacts of the cutoff relay of the associated line circuit connected in series with normally closed contacts of the associated line relay. A path is not conductive until both series contacts are closed. Assuming that line circuit A, group A' is in lockout, the contacts CA10-A' of the cutoff relay CA are closed (cutoff relay CA is energized) and the contacts LA4-A' of the line relay LA are closed (line relay LA is de-energized). A complete electrical loop can be traced via this path to the power terminal 16 from the power terminal 14 through the normally closed contacts I1 of an indicating relay I, which is common to all the monitor circuits, a diode 72A', which is connected to all electrical paths in group A', a diode 74A-A' and a light source 76A' in series with a resistor 78A', the latter two being connected to all the paths in monitor circuit A'. The light source 76A' glows whenever one or more of the line circuits A–N in group A' is in lockout, thus providing an indication that a lockout condition exists within group A'.

Each electrical path in a monitor circuit is connected to an individual one of a plurality of light sources which is different for each path for identifying the specific line circuit which is in lockout. These light sources 84A–84N cannot glow until a manual switch, an individual one for each monitor circuit or groups of line circuits, is closed. For example, when a manual switch 80A' corresponding to group A' is closed, a complete loop is established between the power terminals 14 and 16 for energizing the relay I through a diode 82A'. A diode 83 is connected across the terminals of relay I to eliminate voltage spikes which may develop across the coil when the relay is released. When actuated, relay I opens the normally closed contacts I1, thus, removing this power path from the terminal 14 from all the monitor circuits. The manual switch 80A', however, connects the power terminal 14 to its associated monitor circuit A' or group of lines through a diode 86A' connected to all the electrical paths in group A', thereby establishing a path for operating the common light source 76A' for the monitor circuit A'. When actuated, relay I also closes all the normally open contacts 88A–88N interconnecting the individual light sources between the power terminal 16 and the separate electrical paths in each monitor circuit. Those paths in group A' in which the series contacts are closed (CA10–A' and LA4–A', for instance) will permit current to flow between the power terminals 14 and 16 through the common diode 86A', the connected light source (84A) and a separate diode (90A–A'), thus, identifying the individual line circuits of the group which are in lockout. It should be noted that one electrical path from each monitor circuit is connected in common to a corresponding individual light source. Although this is so, current will flow in only that electrical path in the monitor circuit whose manual switch is closed (A' in our example) since all the other monitor circuits are not connected to the power terminal 14 at this time (the contacts I1 are open).

Figure 3:
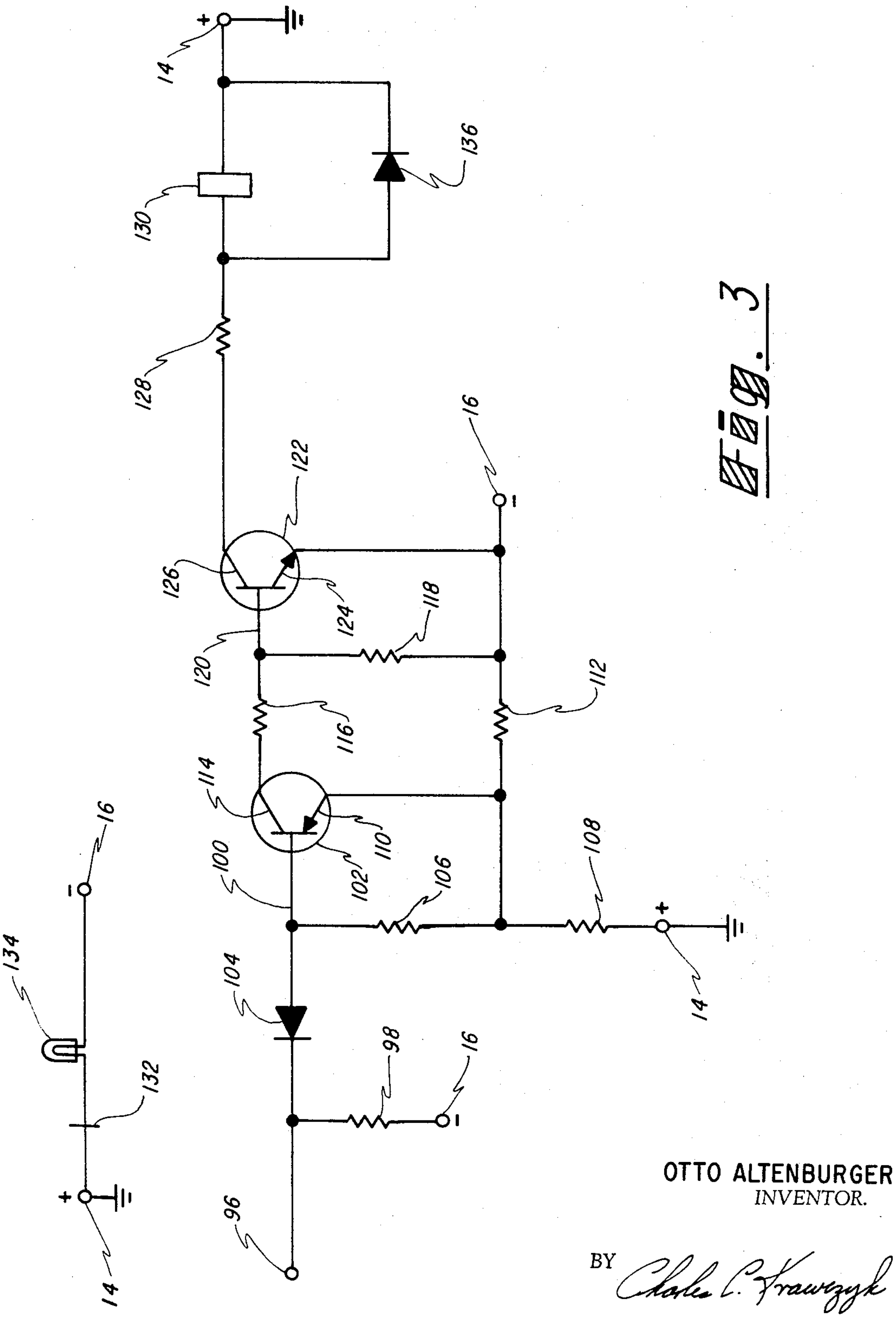
FIG. 3 shows an alarm circuit for connection to the plurality of monitor circuits shown in FIG. 2 for providing an indication that a preset number of line circuits are in lockout.

The invention also includes an alarm circuit which is connected to the monitor circuits and is referred to as the accumulator lockout circuit indicator (ALC). This circuit which is illustrated in FIG. 3 provides an alarm signal whenever a preset number of line circuits are in lockout irrespective of how the line circuits in lockout are distributed throughout the groups.

Each electrical path in each monitor circuit is connected in common to an input terminal 96 of the ALC through an individual resistor (92A–A') in series with an individual diode (94A–A') (FIG. 2). A resistor 98 in the ALC (FIG. 3) interconnects the power terminal 16 to the common connection input terminal 96. The base 100 of a transistor 102 is connected to the input 96 through a diode 104. Two resistors 106 and 108 are connected in series between the base 100 and the power terminal 14. The emitter 110 of the transistor 102 is connected to the junction of the resistors 106 and 108 and is also connected to the power terminal 16 through a resistor 112. The collector 114 of the transistor 102 is connected to the power terminal 16 through two series connected resistors 116 and 118. The base 120 of a second transistor 122 is connected to the junction of the resistors 116 and 118. The emitter 124 of the transistor 122 is connected directly to the power terminal 16. The collector 126 of the transistor 122 is connected to the power terminal 14 through a resistor 128 in series with a coil of a relay 130. The relay 130 controls the contacts 132 which are connected in series with a light source 134 between the power terminals 14 and 16. A diode 136 is connected across the terminals of relay 130 to eliminate voltage spikes which may develop across the coil when the relay is released.

The value of biasing resistors 98, 106, 108, 112, 116 and 118 are selected so that when the number of line circuits in lockout is less than the preset number, both the transistors 102 and 122 are conductive, thereby energizing the relay 130 which keeps the contacts 132 open and prevents current from flowing through the light source 134. When the preset number of line circuits in lockout is reached, both transistors are cut off, thereby de-energizing the relay 130, which closes the contacts 132 and permits current to flow through the light source 134 providing a visual indication of the lockout condition. The transistor 122 can conduct only when the transistor 102 is conducting since it is the current flowing through the emitter 110 and collector 114 of transistor 102 which develops the forward bias voltage across the resistor 118 to render the transistor 122 conductive. The bias voltage for transistor 102 is developed across the resistor 106 by the current which flows between the terminals 14 and 16 via the resistor 98. This portion of current flows through the resistor 106 while the other portion flows through a parallel resistance comprised of a combination of the individual resistors ([92A–A']-[92N–N']) connected in parallel to the ALC through those electrical paths in the monitor circuits in lockout. As more line circuits go into lockout, the resistance between the terminal 96 and the power terminal 14 is reduced, which as a result, develops less forward bias for transistor 102 since less current tends to flow through resistor 106 thereby causing a smaller voltage drop in this resistor. At somepoint, a sufficient number of these individual resistors will be in parallel (equal to the preset number of line circuits required for alarm) to reduce the bias to the transistor 102 below the required point to maintain transistor 102 conductive. At this point, transistor 102 cuts off transistor 102 causing the light source 134 to operate as previously described. The resistance value of the resistor 98 determines the minimum number of individual resistors in parallel (and therefore the preset number of line circuits in lockout) required for the ALC to provide an alarm indication of lockout.

As the foregoing shows, the line circuit with lockout provides all the steps required for connecting an individual telephone line to a telephone switching network. In addition, with the use of a minimum number of standard dual coil relays, the line circuit with lockout incorporates the lockout feature for monitoring and indicating lockout conditions, thus, affording a desirable, yet economical, detection means for preventing telephone switching equipment from being unnecessarily tied up by abnormal telephone line conditions. Furthermore, the line circuit operates in a balanced configuration, thus, eliminating the possibility of AC noise signals causing false operations of the line relay used in the line circuit.

What is claimed is:

1. A line circuit with lockout for interconnecting an individual telephone line to a telephone switching network comprising:

a dual coil line relay;

a dual coil cutoff relay;

first circuit means for connecting a first coil of said cutoff relay to the telephone switching network to be operated in response to a signal from the switching net-work, said means including a resistive-capacitive circuit for retarding the response time of said first coil;

second circuit means for connecting said line relay to the telephone line in a balanced circuit configuration and to the switching network so that said line relay is energized through the telephone line when said cutoff relay is not operated and is disconnected from the tele-phone line to be energized solely by the switching net-work signal when said cutoff relay is operated, and third circuit means for connecting the second coil of said cutoff relay to the telephone line to be energized therethrough when said first coil of said cutoff relay is energized and said line relay is deenergized upon removal of the switching network signal.

2. A line circuit with lockout as defined in claim 1 wherein said second circuit means connects each of the coils of said line relay between a different terminal of a DC power source and a different conductor of the telephone line through normally closed contacts of said cutoff relay.

3. A line circuit with lockout as defined in claim 1 wherein said third circuit means connects the second coil of said cutoff relay in series with the telephone line and a DC power source so that said cutoff relay is energized via a closed loop path through the telephone line after the switching network signal is removed.

4. A line circuit with lockout as defined in claim 3 wherein:

said third circuit means connects the second coil of said cutoff relay to a conductor of the telephone line through normally open contacts of said cutoff relay and normally closed contacts of said line relay.

5. A line circuit with lockout as defined in claim 3 wherein:

said third circuit means connects a power terminal to one wire of the telephone line through normally closed contacts of the line relay and normally open contacts of said cutoff relay, and connects the second coil of said cutoff relay between the other wire of the telephone line and the other power terminal through normally closed contacts of said line relay and normally open contacts of said cutoff relay.

6. A line circuit with lockout for inter-connecting an individual telephone line to a telephone switching network comprising:

a plurality of terminals;

a dual coil cutoff relay;

a dual coil line relay having one coil connected through normally closed contacts of said cutoff relay between a terminal of a DC power source and a first one of said plurality of terminals and the other coil connected through other normally closed contacts of said cutoff relay between the other power terminal and a second one of said plurality of terminals, said first and second terminals being connected to the telephone line directly;

first circuit means for connecting one of the coils of said cutoff relay between one of the power terminals and a third one of said plurality of terminals to be energized by a control signal applied to said third terminal from the switching network;

normally open contacts of said cutoff relay interconnecting the first terminal to a fourth one of said plurality of terminals and the second terminal to a fifth one of said plurality of terminals;

a mark relay connected between a sixth one of said plurality of terminals and one of the power terminals to be energized by a mark control signal applied to said sixth terminal;

normally open contacts of said mark relay interconnecting a seventh and an eighth one of said plurality of terminals for passing a mark signal;

second circuit means for connecting the sixth terminal to a ninth one of said plurality of terminals through normally closed contacts of said cutoff relay to provide an indication that the line circuit is busy;

third circuit means for connecting a tenth one of said plurality of terminals to said second circuit means through normally open contacts of said line relay for enabling a scanning signal applied to said tenth terminal to pass therethrough to said ninth terminal to indicate a request for service;

fourth circuit means for connecting said third terminal to the junction of one of said line relay coils and the normally closed contacts of said cutoff relay for energizing said line relay by said control signal;

fifth circuit means for connecting said first terminal to one of the power terminals through normally open contacts of said cutoff relay and normally closed contacts of said line relay, and sixth circuit means for connecting said second terminal to the outer power terminal through said other coil of said cutoff relay through normally open contacts of said cutoff relay and normally closed contacts of said line relay.

7. A line circuit with lockout as defined in claim 6 wherein said first and fourth terminals and said second and fifth terminals are respectively for tip and ring leads, said third terminal is for a sleeve lead, said sixth and ninth and tenth terminals are for line scanner-marker circuit leads and said seventh and eighth terminals are for mark leads.

8. A line circuit with lockout as defined in claim 6 wherein said first circuit means includes a capacitor and resistor for retarding the response time of said cutoff relay.

9. A line circuit with lockout as defined in claim 6 wherein said second and third circuit means each includes a unidirectional current conductor device.

10. In combination with a plurality of telephone line circuits arranged in groups, each line circuit having a line relay which is deenergized and a cutoff relay which is energized when the line circuit is in lockout, a line circuit monitoring arrangement comprising:
- a plurality of line circuit means, one for each line circuit having contacts of the line and cutoff relays of the associated line circuit for providing a signal when the associated line circuit is in lockout;
- group circuit means connected to said plurality of line circuit means for identifying line circuit groups having at least one line circuit in lockout, and
- a plurality of identification circuit means, one for each line circuit group connected to the line circuit means of the line circuits in its respective groups for identifying the individual line circuits therein in lockout.

11. A line circuit monitoring arrangement as defined in claim 10 including:
- accumulator circuit means connected to said plurality of line circuit means for providing a signal with a preset number of line circuits are in lockout.

12. A line circuit monitoring arrangement as defined in claim 10 wherein said group circuit means includes:
- a first plurality of signalling devices, one for each of said groups of line circuits responsive to a signal from at least one line circuit means in its associated group for providing an indication that at least one line circuit in its associated group is in lockout.

13. A line circuit monitoring arrangement as defined in claim 12 wherein each of said identification circuit means includes:
- a plurality of signalling devices, each when enabled being responsive to the signal from a different one of the line circuit means in the associated group, and
- switch means which is actuated for enabling said signalling devices to respond to their respective signals.

14. A line circuit monitoring arrangement as defined in claim 13 including:
- accumulator circuit means connected to all of said plurality of line circuit means for providing an indication when a preset number of line circuits are in lockout.

15. A line circuit monitoring arrangement as defined in claim 14 wherein said accumulator circuit means includes:
- an alarm device, and
- a summing circuit having its output connected to said alarm device and its input connected to all of said plurality of line circuit means wherein said summing circuit is responsive to a preset number of lockout signals to actuate the alarm device.

16. A line circuit monitoring arrangement as defined in claim 15 wherein each of said line circuit means includes:
- resistive means connected in parallel with one another when their associated line circuits are in lockout so that the resistance presented to the input circuit of said summing circuit decreases as the number of circuits in lockout increases.

17. A line circuit monitoring arrangement as defined in claim 16 wherein:
- the input circuit of said summing circuit includes a transistor circuit having a biasing circuit connected to all of said plurality of line circuit means wherein the transistor is cut off when the resistance presented by said first circuit means reaches a preset level.

* * * * *